United States Patent Office 3,575,776
Patented Apr. 20, 1971

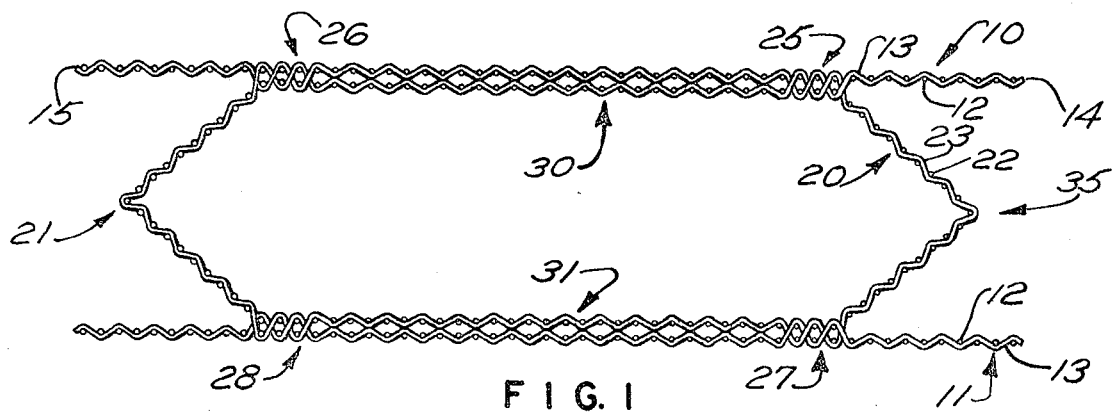
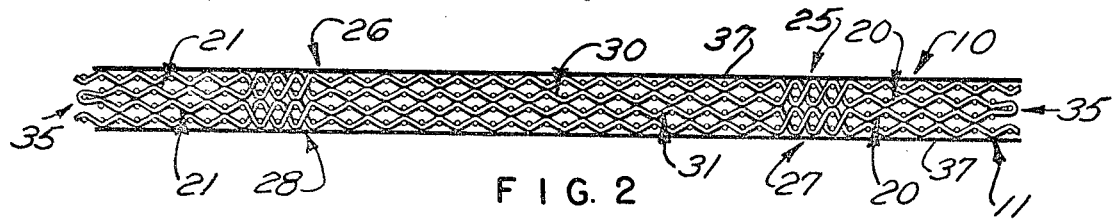
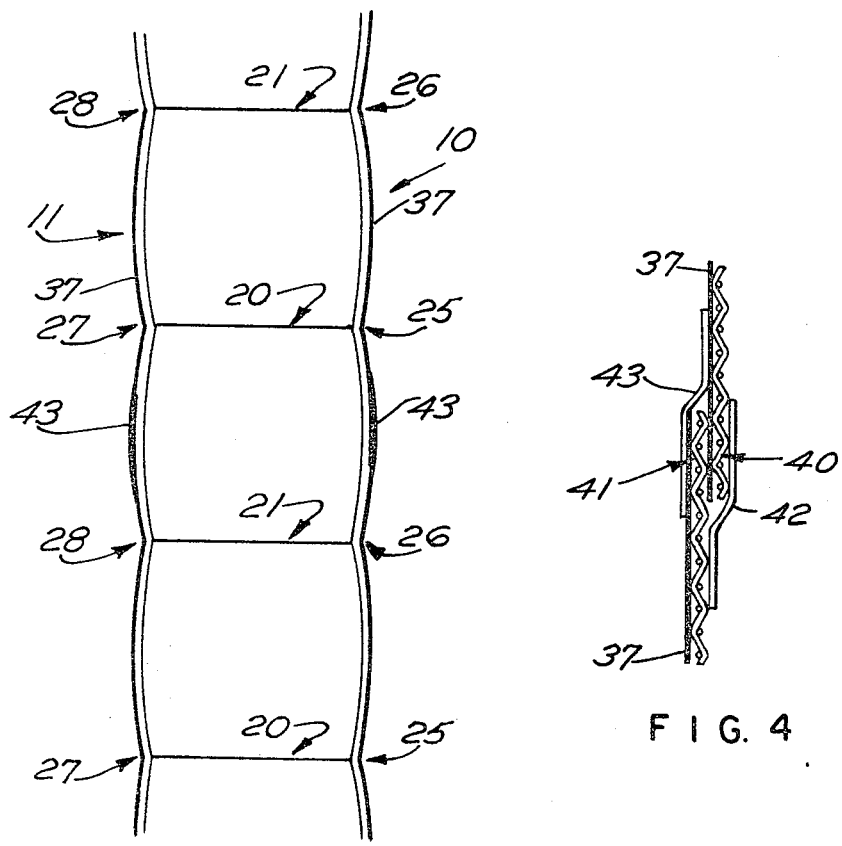
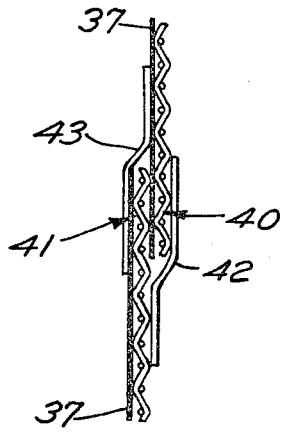
FIG. 1
FIG. 2
FIG. 3
FIG. 4
INVENTOR
JOHN A. MACINTYRE
BY
Barlow & Barlow
ATTORNEYS

3,575,776
INFLATABLE FABRIC
John A. MacIntyre, Barrington, R.I., assignor to
U.S. Plush Mills, Inc.
Filed Nov. 19, 1968, Ser. No. 777,006
Int. Cl. D03d *1/02;* A45f *1/02;* D06m *17/00*
U.S. Cl. 161—49                             3 Claims

ABSTRACT OF THE DISCLOSURE

A fabric having spaced woven layers with a woven web extending between the layers and woven into each of the spaced layers with a woven ply between the points of connection of the web to the spaced layers forming in collapsed condition a substantially smooth multi-ply fabric of the same thickness throughout its length and width for ease in uniformly coating the outer surface of the layers.

BACKGROUND OF THE INVENTION

Inflatable fabrics for tent and housing structures heretofore have usually consisted of separately formed outer and inner layers with a separate spacer or web cemented to the inner and outer layers connecting them together such as may be seen in Pat. 3,055,379 or where woven in tabs have been utilized to engage and be cemented to the connecting webs as seen in Pat. 3,294,605. This type of structure requires a substantial amount of manual work in order that it be formulated, there being an operation for weaving each of the layers and a subsequent operation for connecting the layers one to the other by the webs.

SUMMARY OF THE INVENTION

This fabric is woven in one piece with opposite layers and the connecting webs between them joining the outer and inner layers. Also a woven ply of fabric extends along the layers between the points of connection of the webs to each layer and of the same thickness as the web structure so that when the composite fabric is collapsed with the connecting webs extending outwardly from their points of connection to the layers, the fabric will be smooth and of a uniform thickness throughout for ease in coating, coating being difficult if there is an uneven or non-uniform thickness of surface as the coating is applied.

DESCRIPTION OF THE DRAWINGS

FIG. 1 is a weftwise sectional view of the composite fabric with the layers spread apart partially and showing the web formation between the layers;

FIG. 2 is a view similar to FIG. 1 but with the layers in collapsed position and showing a coating applied to the outer surfaces of the opposite layers;

FIG. 3 is a fragmentary cross section of two fabrics such as shown in FIG. 1 connected together and inflated; and FIG. 4 is a sectional view on a larger scale showing the joint between two pieces of fabric.

DESCRIPTION OF THE PREFERRED EMBODIMENT

In FIG. 1 there are spaced woven layers of fabric 10 and 11 each containing warp threads 12 and weft or filling threads 13. A selvage is provided at the opposite edges 14 and 15 of each layer by reason of the reversal direction of the weft threads 13. The layer 11 is similarly formed and in fact substantially identical with the layer 10.

Between the layers 10 and 11 there are woven webs 20 and 21, also each containing warp threads 22 and weft or filling threads 23. At location 25 the web 20 is interwoven with the layer 10 to form an integrated connection of a few ends and this also occurs at 26 in the fabric 10 and at locations 27 and 28 between the webs 20 and 21 and the layer 11 of the woven fabric. Thus the webs 20 and 21 are integrally and firmly connected with the layers 10 and 11 at these spaced locations. In the area 30 between the points of connection 25 and 26 the same filling threads 23 that formed the woven webs extend along the layer 10 and are woven with warp threads which also extend lengthwise of the fabric in the area. Likewise the same situation occurs in area 31 between the points of connection 27 and 28 so that a woven fabric is provided in this area 31 between the points of connection 27 and 28.

The points of connection 25 and 26 are so related to the selvages 14 and 15 of the outer and inner layers that when folded about a mid point 35 they will be at the selvages 14 and 15 when the fabric is in collapsed position as shown in FIG. 2. Thus, there are four layers of fabric at all points between the selvages of the composite fabric making an even smooth surface from selvage to selvage so that coating as shown at 37 may be smoothly and evenly applied to the outer surface of one or both of the two layers. The coating may be of neoprene or vinyl material in one or more thinly doctored coats which will impregnate the layer.

In connecting two fabrics together, the opposite edges are overlapped as at 40 and 41 and cemented together with a covering tape 42 on one side covering these joints. In some cases a tape 43 on the other side may be used. This tape will be of a suitable adhesive variety so as to firmly attach to the coated layers both inner and outer layers of the fabric. The web portions are not coated and these webs are of a porous nature so that air will pass through them. However, the coating prevents the air from escaping between the opposite layers 10 and 11 and thus a tent or housing structure may be formed from a fabric pieced together which will be extremely strong in construction by reason of the weaving in of the webs which prevent the separation of the layers but permit them to be spaced a certain distance to contain the inflating air. Some strength is gained by a connection of the webs along the inner surface of each of the layers.

The interconnected fabric sections may be used, for example, to form an air supported, double wall tent hemi-cyclindrical in configuration. In such a case, the webs will extend vertically and thus FIG. 3 of the drawings may be considered a horizontal sectional view.

I claim:
1. A fabric to be inflated comprising outer and inner woven layers containing warp and weft threads and each having opposite edges, a pair of spaced woven webs extending warpwise of the fabric located between said layers and containing warp and weft threads, said layers and said webs being super-imposed upon and coextensive, each with the other, and each of said webs being woven into its adjacent layer at a pair of spaced apart points and being generally parallel to said layers between said points, said points being spaced inwardly from the edges of said layers, said webs being interwoven together at their edges and free of attachment to said layers outwardly of said points, whereby the fabric can be inflated and when collapsed with the webs extending outwardly and folded in face to face contact will provide a composite fabric of four layer thickness from edge to edge weftwise of the fabric.

2. A fabric as in claim 1 wherein said fabric has an air impervious coating on the outer surface of said outer layer.

3. A fabric as in claim 1 wherein said fabric has an air impervious coating on the outer surface of said outer and inner layers.

References Cited

UNITED STATES PATENTS

| | | | |
|---|---|---|---|
| 3,090,406 | 5/1963 | Koppelman et al. | 139—410 |
| 3,207,185 | 9/1965 | Koppelman et al. | 139—20 |
| 3,234,972 | 2/1966 | Koppelman et al. | 139—384 |
| 3,294,605 | 12/1966 | Fischer | 139—384 |

ROBERT F. BURNETT, Primary Examiner

J. J. BELL, Assistant Examiner

U.S. Cl. X.R.

161—88, 98; 139—384, 410